(12) United States Patent
Sutton et al.

(10) Patent No.: US 7,739,191 B2
(45) Date of Patent: Jun. 15, 2010

(54) METHOD AND SYSTEM FOR TRANSACTING A PURCHASE USING A CREDIT CARD FROM THE SELLER

(76) Inventors: David B. Sutton, 804 Medowlands, Monroe, MI (US) 48161; Douglas E. Blasiman, 18930 Mercer Rd., Bowling Green, OH (US) 43402

( * ) Notice: Subject to any disclaimer, the term of this patent is extended or adjusted under 35 U.S.C. 154(b) by 542 days.

(21) Appl. No.: 11/548,083

(22) Filed: Oct. 10, 2006

(65) Prior Publication Data

US 2007/0130051 A1    Jun. 7, 2007

Related U.S. Application Data

(63) Continuation of application No. 09/420,033, filed on Oct. 18, 1999, now abandoned.

(51) Int. Cl.
*G06Q 40/00* (2006.01)
(52) U.S. Cl. .......................................... 705/39; 705/37
(58) Field of Classification Search .................. 705/37, 705/26, 14, 30, 39
See application file for complete search history.

(56) References Cited

U.S. PATENT DOCUMENTS

| | | |
|---|---|---|
| 3,786,890 A | 1/1974 | Shank |
| 5,172,786 A | 12/1992 | Ishibashi et al. |
| 5,420,926 A | 5/1995 | Low et al. |
| 5,477,038 A | 12/1995 | Levine et al. |
| 5,511,121 A | 4/1996 | Yacobi |
| 5,577,109 A | 11/1996 | Stimson et al. |
| 5,621,787 A | 4/1997 | McKoy et al. |
| 5,663,546 A | 9/1997 | Cucinotta et al. |
| 5,794,207 A | 8/1998 | Walker et al. |
| 5,819,234 A | 10/1998 | Slavin et al. |
| 5,835,896 A | 11/1998 | Fisher et al. |
| 5,883,810 A | 3/1999 | Franklin et al. |

(Continued)

FOREIGN PATENT DOCUMENTS

EP    0921487 A3    3/1998

(Continued)

OTHER PUBLICATIONS

Asset Sales Report (Credit Card Issuers Finance Seller's Interests, May 29, 1995; p. 1; vol. 9, No. 21).*

(Continued)

*Primary Examiner*—Ojo O. Oyebisi
*Assistant Examiner*—Andrew J Fischer
(74) *Attorney, Agent, or Firm*—Brooks Kushman P.C.

(57) ABSTRACT

A method is provided for transacting a purchase between a buyer and a seller over the Internet. The method comprises the steps of: (a) offering an item for sale through the use of a purchase transaction manager, where the purchase transaction manager resides on a computing device interconnected to the Internet; (b) providing credit account information from the seller of the item to the purchase transaction manager; (c) receiving at least one acceptable bid on the item from a potential buyer, where each acceptable bid includes credit account information for the potential buyer; (d) determining a winning bid on the item, thereby identifying a buyer for the item; and (e) transacting a purchase between the buyer and the seller using the credit account information from the buyer and the seller.

10 Claims, 3 Drawing Sheets

U.S. PATENT DOCUMENTS

| | | | |
|---|---|---|---|
| 5,884,272 | A | 3/1999 | Walker et al. |
| 5,903,880 | A | 5/1999 | Biffar |
| 5,915,007 | A | 6/1999 | Klapka |
| 5,991,413 | A | 11/1999 | Arditti et al. |
| 6,000,608 | A | 12/1999 | Dorf |
| 6,006,205 | A | 12/1999 | Loeb et al. |
| 6,006,988 | A | 12/1999 | Behrmann et al. |
| 6,014,646 | A | 1/2000 | Vallee et al. |
| 6,047,888 | A | 4/2000 | Dethloff |
| 6,076,731 | A | 6/2000 | Terrell |
| 6,105,009 | A | 8/2000 | Cuervo |
| 6,145,741 | A | 11/2000 | Wisdom et al. |
| 6,185,545 | B1 | 2/2001 | Resnick et al. |
| 6,188,944 | B1 | 2/2001 | Kolmanovsky et al. |
| 6,189,787 | B1 | 2/2001 | Dorf |
| 6,202,051 | B1 * | 3/2001 | Woolston .................. 705/27 |
| RE37,122 | E | 4/2001 | Levine et al. |
| 6,226,364 | B1 | 5/2001 | O'Neil |
| 6,227,323 | B1 | 5/2001 | Ashida |
| 6,240,396 | B1 | 5/2001 | Walker et al. |
| 6,246,755 | B1 | 6/2001 | Walker et al. |
| 6,341,283 | B1 | 1/2002 | Yamakawa et al. |
| 6,345,766 | B1 | 2/2002 | Taskett et al. |
| 6,405,182 | B1 | 6/2002 | Cuervo |
| 6,467,684 | B2 | 10/2002 | Fite et al. |
| 6,473,500 | B1 | 10/2002 | Risafi et al. |
| 6,502,745 | B1 | 1/2003 | Stimson et al. |
| 6,510,912 | B1 | 1/2003 | Atsuumi |
| 6,547,021 | B1 | 4/2003 | Kai et al. |
| 6,615,189 | B1 | 9/2003 | Phillips et al. |
| 6,970,852 | B1 | 11/2005 | Sendo et al. |
| 7,054,838 | B2 | 5/2006 | Sutton et al. |
| 2001/0001321 | A1 | 5/2001 | Resnick et al. |
| 2001/0042784 | A1 | 11/2001 | Fite et al. |
| 2002/0026418 | A1 | 2/2002 | Kopel et al. |
| 2002/0026420 | A1 | 2/2002 | DuPhily |
| 2002/0160671 | A1 | 10/2002 | Berthiaume et al. |
| 2002/0174016 | A1 | 11/2002 | Cuervo |

FOREIGN PATENT DOCUMENTS

| | | | |
|---|---|---|---|
| WO | 9638801 | A1 | 6/1996 |
| WO | 9740616 | A1 | 10/1997 |
| WO | 9903057 | A1 | 1/1999 |
| WO | WO 9903057 | A1 * | 1/1999 |
| WO | 0103033 | A1 | 1/2001 |
| WO | 0137228 | A1 | 5/2001 |
| WO | 01/45052 | A3 | 6/2001 |
| WO | 0171673 | A1 | 9/2001 |

OTHER PUBLICATIONS

Angel Abcede, "Plastic Payment Storm Prepares to Touch Down," National Petroleum News, v89, n1, pp. 26-34, Jan. 1997.

Ambalink Launches Secure Online Shipping in the UK, Universal News Services, Jun. 8th, 1999.

Dyan Machan, "New Age Edison," Forbes Magazine, May 17, 1999, pp. 178-185.

Thomas J. Frey, "The Internet Commission," The DaVinci Institute, retrieved from www.davinci-institute.com/the2.htm on Jan. 17, 2001.

Thomas O Bennion, "The Debit Card's Expanding Frontiers," Credit Card Management (Magazine), (5 pages.).

Jeffrey Kutler, "Visa MasterCard Square Off for Debit Fight," American Banker (Magazine), p. 3, vol. 1593, No. 247, Dec. 20, 1998, Dialog File 625, Accession No. 0094030.

The Gale Group, "Banks Enter a New Debit Market and AmEx Has its Foot In the Door," Debit Card News, vol. 4, No. 11, Nov. 30, 1998.

* cited by examiner

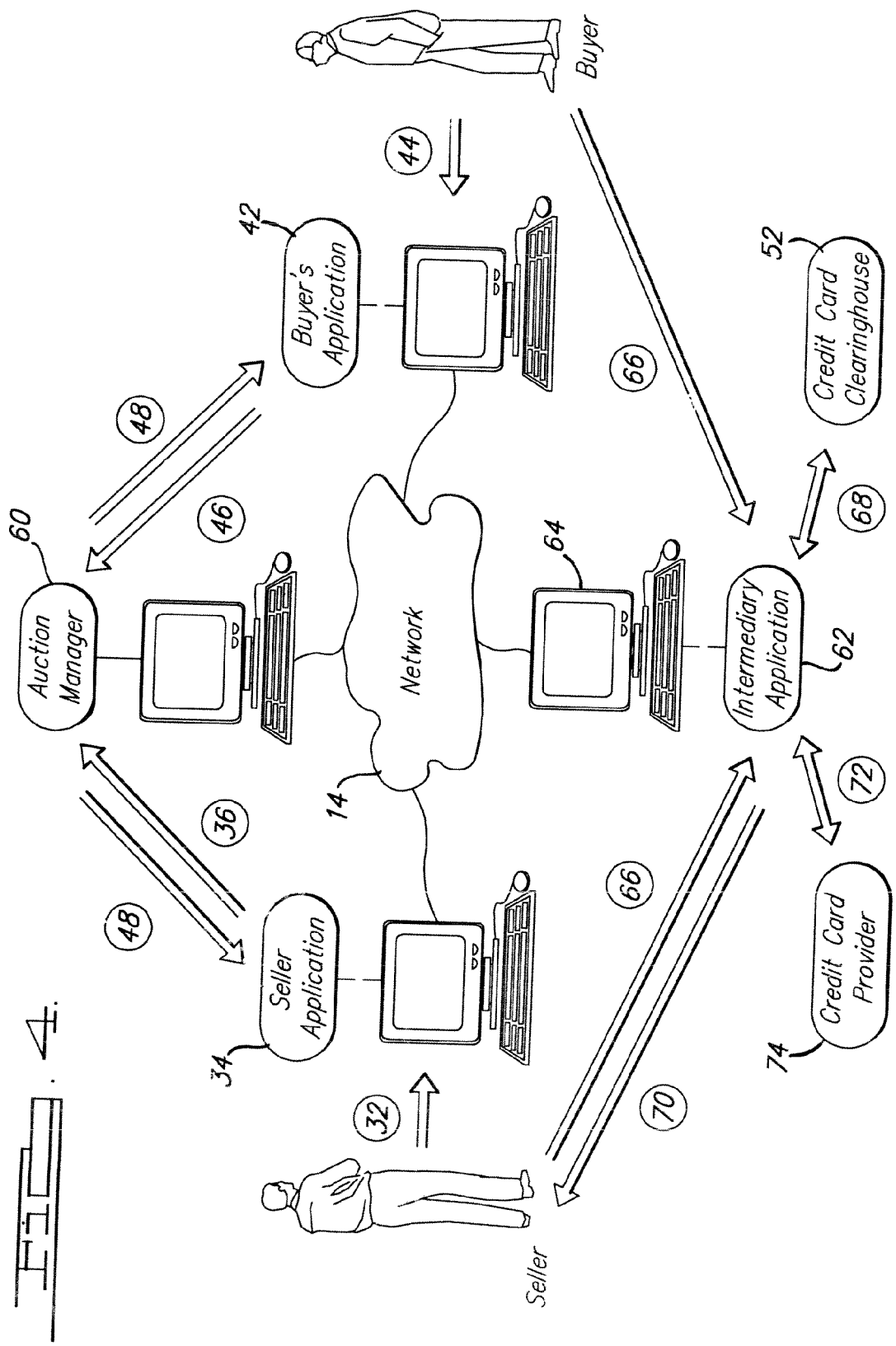

METHOD AND SYSTEM FOR TRANSACTING A PURCHASE USING A CREDIT CARD FROM THE SELLER

CROSS-REFERENCE TO RELATED APPLICATIONS

This application is a continuation of U.S. application Ser. No. 09/420,033 filed Oct. 18, 1999, the entire disclosure which is incorporated herein.

BACKGROUND OF THE INVENTION

The present invention relates generally to a method for making a purchase over the Internet, and more particularly to a method of transacting a purchase using credit account information from both the buyer and the seller.

Currently, "auction type" web sites, such as eBay.com, have demonstrated a good deal of success by providing an online person-to-person trading forum over the Internet. These "auction type" sites act primarily as a matchmaker between sellers and bidders.

Generally, a seller desiring to sell an item over the Internet lists the item with an "auction type" web site. Along with a description of the item, the listing may include a picture of the item, a minimum bid, a time duration for the bidding process, etc. Potential buyers are then able to place bids on the item. A successful or winning bid for each item on sale is determined by the web site. Next, a successful bidder (i.e., the buyer) receives instructions as to where they should send payment. Typically, the payment must be remitted in the form of a certified check to the seller. Upon receipt of the check, the seller ships the item to the buyer.

Unfortunately, this payment process is very inconvenient as well as inconsistent with the ease of other commercial transactions occurring over the Internet. In addition, there is an inherent risk that after receiving payment, the seller may ship an item which is in poor condition, ship an item which is inconsistent with the description of the item or never ship the item to the buyer.

Therefore, it is desirable to provide a method of transacting a purchase between a buyer and a seller over the Internet. It is the object of the present invention to provide a payment process as seamless as the sale itself. To do so, the method of the present invention utilizes credit card information from both the buyer and the seller.

SUMMARY OF THE INVENTION

In accordance with the present invention, a method is provided for transacting a purchase over the Internet. The method comprises the steps of: (a) offering an item for sale through the use of a purchase transaction manager, where the purchase transaction manager resides on a computing device interconnected to the Internet; (b) providing credit account information from the seller of the item to the purchase transaction manager; (c) receiving at least one acceptable bid on the item from a potential buyer, where each acceptable bid includes credit account information for the potential buyer; (d) determining a winning bid on the item, thereby identifying a buyer for the item; and (e) transacting a purchase between the buyer and the seller using the credit account information from the buyer and the seller.

For a more complete understanding of the invention, its objects and advantages, refer to the following specification and to the accompanying drawings.

BRIEF DESCRIPTION OF THE DRAWINGS

FIG. 3 is a detailed flow diagram of the method for transacting a purchase using credit account information from the seller in accordance with the present invention; and FIG. 4 is a detailed flow diagram of an alternative method for transacting a purchase using credit account information from the seller in accordance with the present invention.

DETAILED DESCRIPTION OF THE PREFERRED EMBODIMENT

Figure 1:
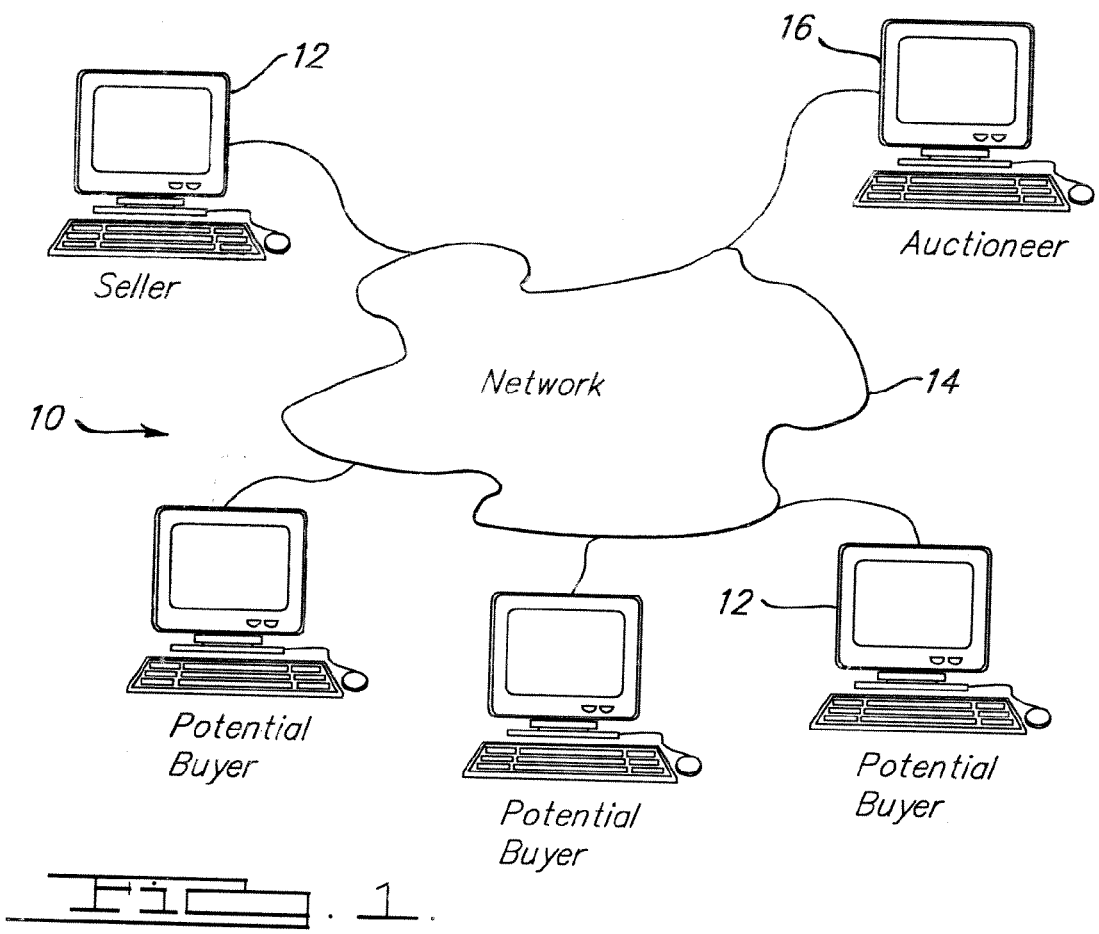
FIG. 1 is a diagram illustrating the basic components of a conventional computer-implemented purchasing system.

FIG. 1 illustrates the basic components of a conventional computer-implemented purchasing system 10. The purchasing system 10 is comprised of a plurality of purchasing computing devices 12 interconnected via a network 14 (e.g., the Internet) to at least one purchase transaction management computing device 16. As will be apparent to one skilled in the art, the computing devices are able to communicate using common communication protocols (e.g., TCP/IP) over different types of network channels. For illustration purposes, a preferred embodiment of the computing device is a personal computer (PC). Of course, it will be appreciated that the principles of the invention can be employed in a wide variety of computing devices, including but not limited to a telephone, a television or a personal digital assistant (PDA).

Figure 2:
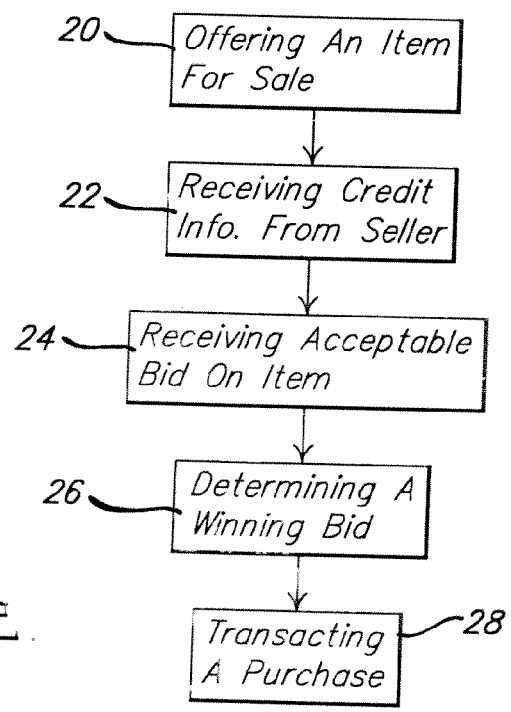
FIG. 2 is a flowchart showing a method for transacting a purchase in accordance with the present invention.
Figure 2:
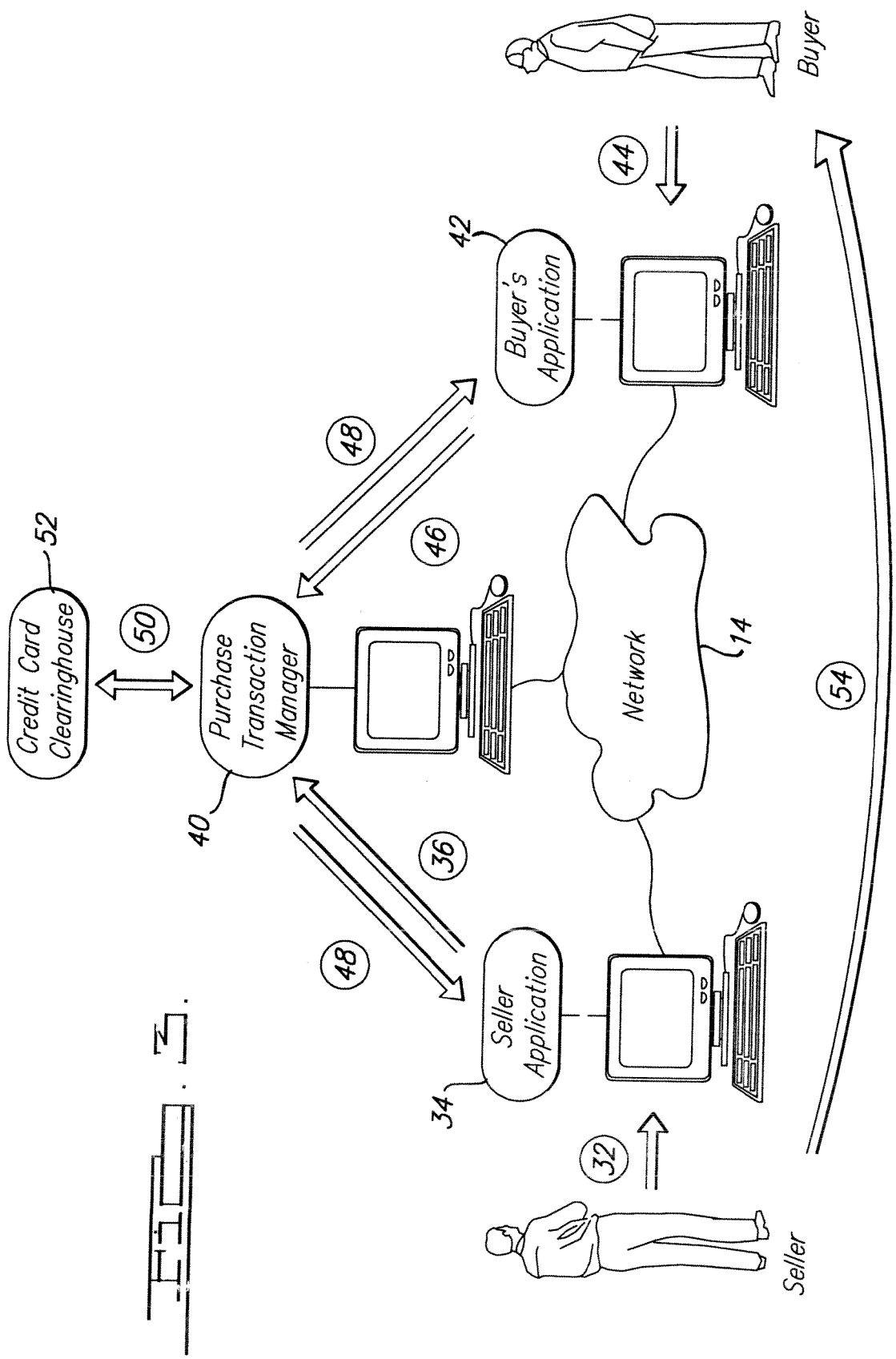

In accordance with the present invention, an overview of a method for transacting a purchase using the computer-implemented purchasing system 10 is shown in FIG. 2. First, a seller offers an item for sale 20 through the use of a purchase transaction manager, where the purchase transaction manager resides on one of the computing devices interconnected to the network 14. In addition to providing transactional information for selling the item, the seller also provides credit account information 22 to the purchase transaction manager.

Next, the purchaser transaction manager receives at least one acceptable bid on the item for sale 24, where each acceptable bid includes credit account information for the potential buyer. A winning bid is then determined 26 from amongst the acceptable bids by the purchase transaction manager, thereby identifying a buyer for the item. Lastly, a purchase is transacted 28 between the buyer and the purchaser. To do so, the purchase transaction manager uses credit account information from both the buyer and the seller. While the following description is provided with reference to credit account information, it is readily understood that debit account information is also within the scope of the present invention.

The purpose of the present invention is to transact a purchase between the buyer and seller over the Internet without the need for either to leave their keyboard. Thus, the method of the present invention relies on the existing credit card platform. More specifically, the purchase is transacted by using credit account information from both the buyer and the seller.

If a retailer or merchant desires to accept credit cards for payment, the merchant must go to a bank to set up a credit account. If approved, the bank assigns the merchant a unique "merchant number" which they would then use to transact business. When a customer makes a purchase from the merchant, the merchant communicates with a credit card clearinghouse for authorization of the transaction. When the customer's transaction is approved the amount of the purchase is debited to the customers credit account and a corresponding amount that is credited to the merchant's account. In effect, any credit card holder has their own "merchant account", i.e., their credit card account. Thus, the seller of an item may also have a merchant account which may be used to transact a purchase over the Internet. The method of the present invention takes advantage of a seller's "merchant account" to transact a purchase between the buyer and the seller over the Internet.

A more detailed description of the method of the present invention is provided in relation to FIG. 3. The seller begins by listing an item for sale on the Internet. To do so, the seller provides transactional information 32 relating to the item via a software-implemented application 34 residing on the sellers local computing device 12. Transactional information may include but is not limited to a description of the item, a minimum bid, a time duration for conducting the auction, shipping information and other parameters needed to complete the transaction. The transactional information also includes credit account information for the seller. The transactional information is then communicated 36 via the network 14 to a purchase transaction manager 40.

In response to receiving the transactional information from the seller, the purchase transaction manager 40 offers the item for sale. Potential buyers are then able to place bids on the item through the use of a software-implemented application 42 residing on the potential buyer's local computing device. The application 42 is receptive of bid information 44 from a potential buyer, including a bid amount and the buyer's credit account information. The bid information is then communicated 46 over the network 14 to the purchase transaction manager 40. An acceptable bid meets all of the transactional parameters provided by the seller and is recorded by the purchase transaction manager 40.

A winning bid for each item is determined by the purchase transaction manager 40. At the end of the auction period, the highest acceptable bid is deemed to be the buyer. The buyer and the seller are then notified 48 of the auction results (e.g., the bidding history, the final bid price, identity of the buyer, etc.). For instance, email messages may be sent to the buyer and seller by the purchase transaction manager 40.

At this point, the purchase transaction manager 40 is able to transact the purchase 50 by using the credit account information received from the buyer and the seller. Credit account information is sent by the purchase transaction manager 40 to a credit card clearinghouse 52. In this way, the purchase transaction manager 40 confirms that the buyer has a valid credit account with sufficient funds for the purchase and that the seller also has a valid credit account. Upon approval, the amount of the purchase is debited to the buyer's credit account and a corresponding amount is credited to the sellers credit account by the credit card clearinghouse 52. It is envisioned that the purchase transaction manager 40 may transact the purchase prior to notifying the parties of the auction results. It should also be noted that by using credit account information to transact the purchase, there is no need for the seller to contact the buyer prior to shipping the item.

Next, the seller would ship the item 54 to the buyer. The credit to the seller's credit account may be placed in a "hold" status until the buyer receives the item from the seller. In this case, the buyer must notify the purchase transaction manager 40 when the goods are received so that the credit may be posted to the sellers credit account.

An alternative approach for transacting a purchase between a buyer and seller is shown in FIG. 4. In this approach, an auction manager 60 replaces the purchase transaction manager 40 as described in FIG. 3. The auction manager 60 oversees the auction process and is similar to a conventional "auction type" web site, such as eBay.com. Accordingly, the auction process is as previously described in relation to purchase transaction manager 40 of FIG. 3.

After the auction manager 60 has determined a winning bid and notified the buyer and seller of the auction results, it is typically up to the buyer and seller to complete the purchase transaction. However, in this alternative approach, an intermediary application 62 facilitates the completion of the purchase transaction between the buyer and the seller. The software-implemented intermediary application 62 resides on a computing device 64 which is operated by a third-party and is interconnected via the network 14 to the above-described purchasing system 10.

In this approach, the buyer and the seller each must access the intermediary application 62. An address or hyperlink may be provided to facilitate access from the auction manager 60 to the intermediary application 62. First, the buyer and the seller must register 66 with the intermediary application 62. Each would be asked a series of questions regarding there purchase. The questions may include a description of the purchased item, purchase price, shipping information (including who will pay shipping costs), and email address. The buyer may also specify an inspection period. The inspection period is the time a user is given to check the purchase item. Once the transaction information is accurate and agreed on, no further modification is allowed. It is also envisioned that the intermediary application 62 may interface with the auction manager 60 in order to verify the accuracy of the purchase-related information.

At this point, their purchase transaction would be assigned a unique transaction number. Using this transaction number, the intermediary application 62 permits the buyer and the seller to view the transactional information. Although the buyer and seller both have access to some of the transactional information, they would not have access to the other party's credit card information or other selective confidential information.

After the transaction details are agreed upon, the intermediary application 62 transacts the purchase 68 between the buyer and the seller. As previously described, credit account information is sent to a credit card clearinghouse 52 by the intermediary application 62. Again, the intermediary application 62 confirms that the buyer has a valid credit account with sufficient funds for the purchase and that the seller also has a valid credit account. Upon approval, the amount of the purchase is debited to the buyer's credit account and a corresponding amount is credited to the seller's credit account by the credit card clearinghouse 52. The seller is then notified by the intermediary application 62 to ship the item to the buyer.

In the case where the seller does not have a credit account, the intermediary application 62 is operative to issue them a debt card 70 with a credit equal to the amount of the purchase. To do so, the intermediary application 62 would interface 72 with their banking affiliate who also serves as a credit card provider 74. The debt card could then be used at other retailers or redeemed for cash at any ATM or bank.

Next, the seller would ship the item to the buyer. If the buyer previously requested an inspection period, the credit to the seller's credit account may be placed in a "hold" status by the credit card clearinghouse 52. The inspection period would begin the day after the buyer received the item from the seller. The buyer must then notify the intermediary application 62 of their satisfaction with the purchased item prior to the end of the inspection period so that the credit may be posted to the seller's credit account.

Should either the buyer or seller fail to fulfill their respective responsibilities as set forth during the registration process, the third party intermediary would reserve the right to bar such individuals from future use of the service. In addition, the intermediary application 62 would advise the auction manager 60 of the misconduct, thereby restricting their access to the auction process.

While the above description constitutes the preferred embodiment of the invention, it will be appreciated that the invention is susceptible to modification, variation, and change without departing from the proper scope or fair meaning of the accompanying claims.

What is claimed is:

1. A method for transacting a purchase between a buyer and a seller using a computer-implemented purchasing system in which the buyer and seller access an intermediary application, the method comprising:
   a) offering an item for sale through an auction manager, said auction manager residing on a first computing device interconnected to a network;
   b) receiving at least one acceptable bid on said item from a potential buyer;
   c) determining a winning bid on said item by said auction manager, thereby identifying a buyer for said item;
   d) issuing a debit card to the seller, the debit card being issued by the intermediary application; and
   e) transacting a purchase between the buyer and the seller using the debit card of step d).

2. The method of claim 1 wherein the buyer and seller register with the intermediary application prior to step b).

3. The method of claim 1 wherein the debit card issued in step d) has a credit for the amount of the winning bid.

4. The method of claim 1 wherein the buyer and seller answer a series of questions prior to step b).

5. The method of claim 1 wherein the seller provides transactional information to the auction manager, the transactional information including a description of the item and a minimum bid amount for the item.

6. The method of claim 1 wherein the buyer specifies an inspection period.

7. The method of claim 6 wherein step e) is delayed until the buyer has inspected the item and indicates satisfaction.

8. The method of claim 1 further comprising the step of shipping the item by the seller to the buyer after step e).

9. The method of claim 1 further comprising assigning a transaction number to the purchase thereby allowing the buyer or seller to view transactional information.

10. A computer-implemented purchasing system for transacting a purchase between a buyer and a seller, the purchasing system comprising:
   a) an auction manager residing on a first computing device interconnected to a network, the auction manager operable to:
      offer a seller's item for sale;
      receiving at least one acceptable bid on said item from a potential buyer;
      determine a winning bid on said item thereby identifying a buyer for said item;
      transact a purchase between the buyer and the seller; and
   b) an intermediary application operable to issue a debit card to the seller after the winning bid is determined, the debit card being used to transact the purchase.

* * * * *